Patented June 15, 1954

2,681,281

UNITED STATES PATENT OFFICE 2,681,281

STABILIZED FATTY COMPOSITIONS AND STABILIZERS THEREFOR

Noel H. Kuhrt, Rochester, N. Y., assignor to Eastman Kodak Company, Rochester, N. Y., a corporation of New Jersey No Drawing. Application January 11, 1952, Serial No. 266,105

9 Claims. (Cl. 99—163)

This invention relates to fatty compositions characterized by improved stability against oxidation and to stabilizer compositions suitable for stabilizing fatty materials.

Fatty materials including solid fats, fatty oils and fatty acids, and particularly the fatty materials consisting predominantly of fatty triglycerides as typified by the animal fats and vegetable oils, whether partially hydrogenated or unhydrogenated, are normally subject to peroxide formation and consequent oxidation. The oxidation of fatty materials results in development of rancidity which, of course, makes such fatty materials unsuitable for many uses and particularly for edible use.

It is accordingly an object of this invention to provide new and improved fatty compositions characterized by enhanced stability against the deleterious effects of normal oxidation.

It is a further object of the invention to provide new fatty compositions, consisting predominantly of fatty triglycerides and normally intended for human consumption, in stable form resistant to the development of objectionable rancidity.

Another object of the invention is to provide new stabilizer compositions for fatty materials.

Another object of the invention is to provide fatty compositions having incorporated therein a minor amount of a new stabilizer composition.

Another object of the invention is to provide new and stable animal fat, vegetable oil and shortening compositions.

Another object of the invention is to provide fatty compositions stabilized against objectionable oxidative rancidity but with the other normally desirable properties unimpaired.

Other objects will be apparent from the description and claims which follow.

These and other objects are attained by the compositions embodying this invention and comprising fatty material normally subject to oxidation, having incorporated therein a solution of glycine and phosphoric acid in a sorbitan fatty acid ester.

The invention is applicable for stabilizing any of the well-known fatty materials normally subject to oxidation including both solid fats and fatty oils, and particularly the fatty materials consisting predominantly of fatty triglycerides or fat-forming fatty acids normally subject to oxidation. Materials consisting of more than 85% of fatty triglycerides include animal fats such as lard, tallow and the like, and vegetable oils such as cottonseed oil, peanut oil, coconut oil, corn oil and the like, whether unhydrogenated or partially hydrogenated to a shortening form. The fatty acids include any of the pure or mixed unsaturated fatty acids as typified by oleic and linoleic acids.

The fatty materials are stabilized in accordance with this invention by incorporating in such fatty material a minor amount of solution of glycine and phosphoric acid in a sorbitan fatty acid ester, preferably at a temperature of 50°–95° C. Any of the well-known sorbitan fatty acid esters, i. e. the fatty acid esters of sorbitol anhydrides, can be used, typical examples of suitable materials being sorbitan monooleate, sorbitan trioleate, sorbitan monostearate, sorbitan monopalmitate and similar sorbitan esters of fat-forming fatty acids, with the fatty acids having at least 12 carbon atoms in the molecule being preferred. Glycine and phosphoric acid are desirably added in the form of the free acid but may be formed in situ by the use of a material furnishing the free acid in the composition as, for example, the use of a salt of phosphoric acid such as sodium phosphate or the use of a crude glycine-furnishing hydrolysate of soy protein, and such materials are within the scope of this invention.

The glycine and phosphoric acid are preferably employed in approximately equal amounts by weight and desirably with the phosphoric acid amounting to not more than twice the weight of glycine. Effective stabilization is obtained with amounts of the glycine and phosphoric acid each of from 0.00005% to 0.02% by weight based on the total composition weight although higher amounts such as 0.1% or even 0.5% or higher of each of the glycine and phosphoric acid can be used if desired. The amount of sorbitan fatty acid ester employed can be varied as desired, but concentrated solutions of the glycine and phosphoric acid are preferred in order to keep the amount of sorbitan fatty acid ester below about 5% by weight based on the total composition weight.

The glycine and phosphoric acid are normally readily soluble in the sorbitan fatty acid ester with such ester in liquid form, the normally solid sorbitan fatty acid esters desirably being melted during addition of the glycine and phosphoric acid thereto or the addition made by means of a solution of glycine and phosphoric acid in glycerol or other suitable mutual solvent. The resulting solution is thereafter incorporated into the fatty material to be stabilized with the usual homogenization or similar steps being taken to ensure adequate dispersion. Best results are obtained by incorporating the sorbitan fatty acid ester solution of glycine and phosphoric acid into the fatty material at a temperature of 40°–95° C. and desirably from about 50° C. to about 90° C., the effectiveness of stabilization being impaired by excessive heating at temperatures above about 95° C.

The development of rancidity can be traced organoleptically, but is usually determined by an analysis of peroxide content of the fat. Thus, the peroxide value (P. V.) is expressed in terms of the number of millimols of peroxide per kilogram of fat and a peroxide value of 20 ordinarily is considered the maximum permissible limit for commercial use. The stability of fatty compositions is commonly evaluated by the accelerated Active Oxygen Method (AOM) wherein the sample of fatty material is heated at 96° C. with air bubbling through it and the stability is expressed in terms of the number of hours necessary to reach a peroxide value of 20.

The invention is illustrated by the following examples of certain preferred embodiments, it being understood that the examples are included for purposes of illustration and are not intended to limit the scope of the invention unless otherwise specifically indicated.

*Example 1*

A glycerol solution containing 4% by weight of glycine and 4% by weight of phosphoric acid was added to sorbitan monopalmitate to give a solution of 0.02% by weight of each of the glycine and phosphoric acid based on the weight of sorbitan monopalmitate. The resulting solution was then mixed into partially hydrogenated cottonseed oil shortening at a temperature of 60° C. and in an amount of 1.5% by weight of such solution based on the weight of shortening. The stability of the resulting fatty composition was then evaluated (AOM), and it was found to have an increase in stability of about 40% over the control sample of such shortening.

*Example 2*

A sample of lard containing 0.0003% by weight of glycine, 0.0003% by weight of phosphoric acid, and 1.5% by weight of sorbitan monopalmitate had a stability of more than 300% of the stability of the untreated control sample, in terms of the number of hours required to reach a peroxide value (AOM) of 20.

*Example 3*

A solution of 0.02% by weight of glycine and 0.02% by weight of phosphoric acid in sorbitan monooleate was admixed with oleic acid in an amount of 1.5% by weight based on the weight of oleic acid. The AOM evaluation showed the resulting stabilized composition to have a stability increased 60% over the control sample.

*Example 4*

A partially hydrogenated cottonseed oil composition was stabilized by the incorporation therein of a solution of glycine and phosphoric acid in sorbitan monooleate amounting to 0.0003% by weight of glycine, 0.0003% by weight of phosphoric acid and 1.5% by weight of sorbitan monooleate based on the weight of fatty material. The stabilizer resulted in an increase of 75% in the stability (AOM) of the partially hydrogenated cottonseed oil.

*Example 5*

Lard was stabilized as in Example 2 with the use of sorbitan monooleate in place of the sorbitan monopalmitate. The AOM stability of the lard was increased 400% over the stability of the control material.

Similar results are obtained with other well-known fatty materials with solutions of glycine and phosphoric acid in other well-known sorbitan fatty acid esters and at varying concentrations. The invention thus provides effectively stabilized fatty compositions suitable for commercial use.

Although the invention has been described in considerable detail with reference to certain preferred embodiments thereof, it will be understood that variations and modifications can be effected within the spirit and scope of the invention as described hereinabove and as defined in the appended claims.

I claim:

1. A fatty composition consisting predominantly of fatty material normally subject to oxidation and containing a minor amount of a stabilizer composition, said stabilizer composition comprising glycine and phosphoric acid dissolved in a sorbitan fatty acid ester.

2. A fatty composition consisting predominantly of fatty acid triglycerides admixed with a solution of glycine and phosphoric acid in a sorbitan fatty acid ester.

3. A fatty composition comprising a predominant portion of fatty material selected from the group consisting of hydrogenated and unhydrogenated animal fats and vegetable oils, and minor portions of glycine and phosphoric acid dissolved in a sorbitan fatty acid ester.

4. A fatty composition comprising at least 85% by weight of fatty triglycerides, from 0.00005% to 0.02% by weight of glycine, and from 0.00005% to 0.02% by weight of phosphoric acid, all based on the total composition weight, said glycine and phosphoric acid being in solution in a sorbitan fatty acid ester.

5. A fatty triglyceride composition having incorporated therein a solution of glycine and phosphoric acid in a sorbitan fatty acid ester, said glycine and said phosphoric acid each being present in an amount of not more than about 0.02% by weight based on the total weight of said composition, said phosphoric acid being present in an amount not greater than twice the weight of said glycine.

6. A shortening having incorporated therein a solution of glycine and phosphoric acid in a sorbitan fatty acid ester.

7. A normally solid fat having incorporated therein a solution of glycine and phosphoric acid in a sorbitan fatty acid ester.

8. A normally liquid fatty oil having incorporated therein a solution of glycine and phosphoric acid in a sorbitan fatty acid ester.

9. A stabilizer for fatty material comprising a solution of glycine and phosphoric acid in a sorbitan fatty acid ester.

References Cited in the file of this patent

UNITED STATES PATENTS

| Number | Name | Date |
| --- | --- | --- |
| 2,511,804 | Hall | June 13, 1950 |
| 2,535,910 | Fonyo | Dec. 26, 1950 |

OTHER REFERENCES

Chem. Abst. 40 (1946), 479$^5$.